April 23, 1929.  I. W. PENNY  1,710,110
LAND LEVELER
Filed Jan. 4, 1927  2 Sheets-Sheet 2
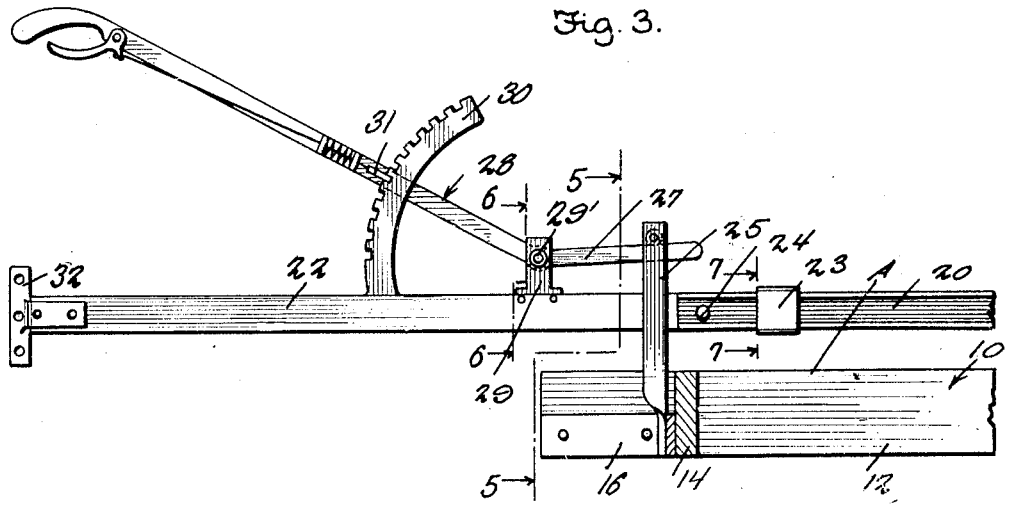
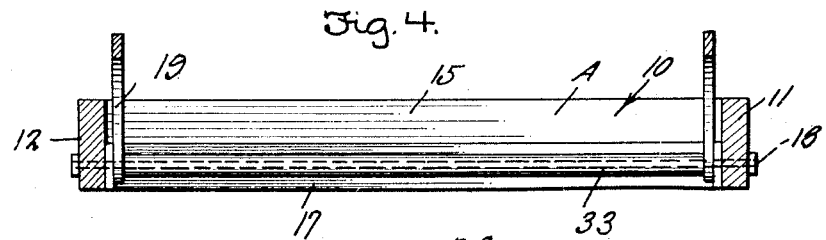
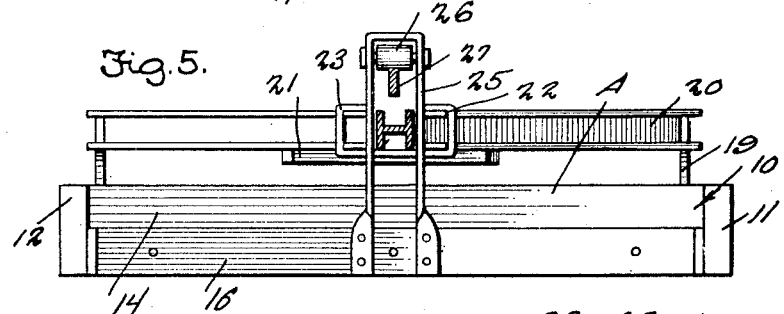
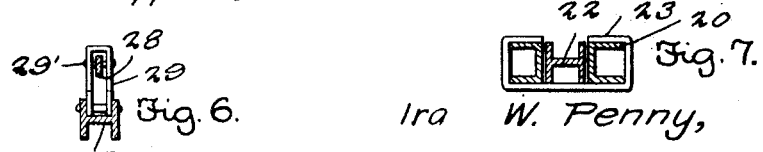
Ira W. Penny, Inventor
Witnesses
C. E. Churchman
By Richard B. Owen
Attorney Patented Apr. 23, 1929.

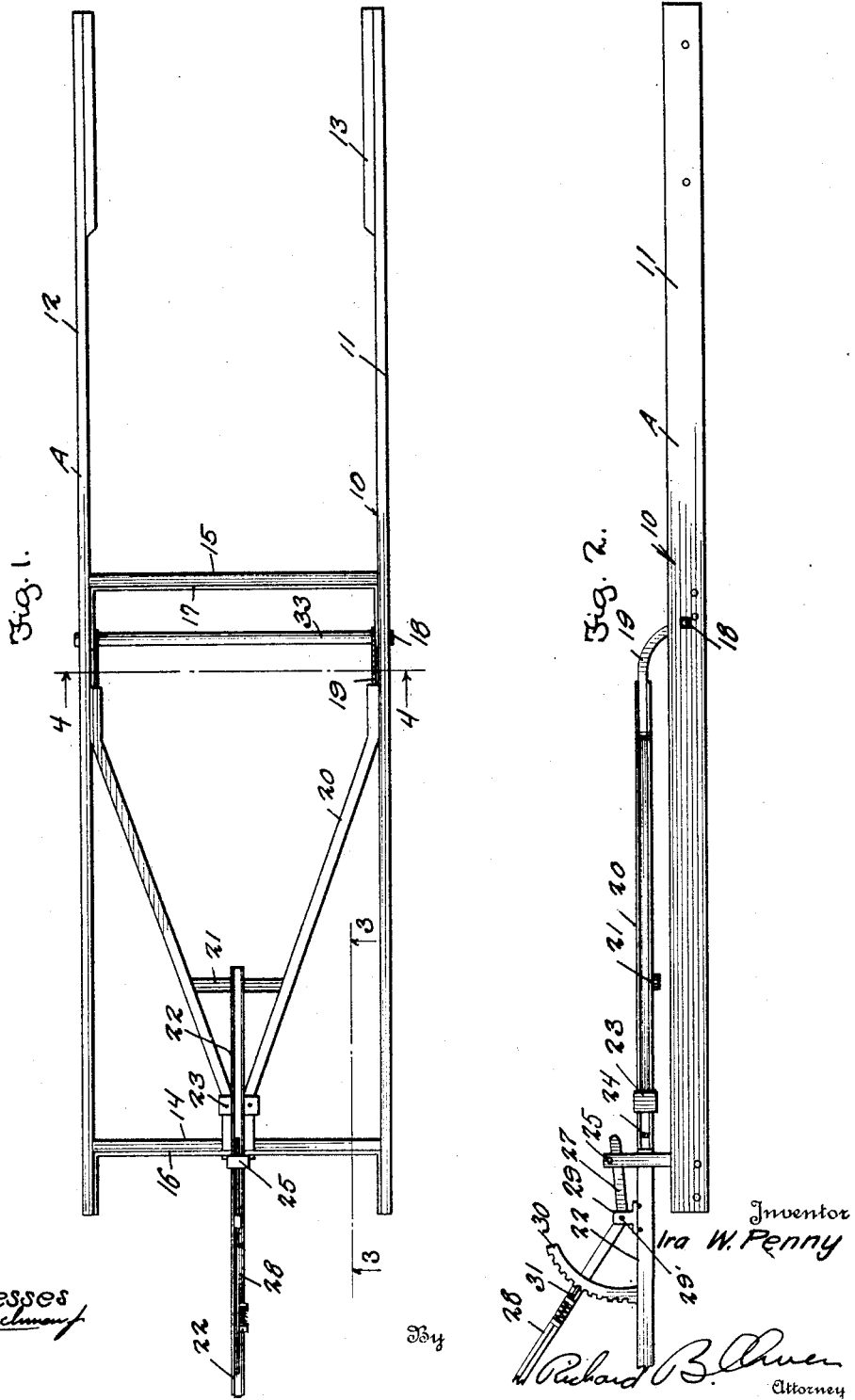

1,710,110

UNITED STATES PATENT OFFICE.

IRA W. PENNY, OF MESA, ARIZONA.

LAND LEVELER.

Application filed January 4, 1927. Serial No. 158,987.

This invention appertains to scrapers or levelers and has for one of its primary objects to provide means for leveling ground without the necessity of dumping the earth or stone into piles, as now contemplated by existing scrapers or levelers such as of the Fresno type.

Another important object of the present invention is the provision of a novel scraper and leveler embodying an elongated frame having scraping means arranged transversely thereof, the scraping means acting to level the earth and to distribute the same evenly over the ground.

A further object of the invention is to provide a novel hitch carried by the scraper and leveler for permitting the connection thereof with tractors or other source of power, with means for permitting the adjusting of the scraper relative to the ground.

A further object of the invention is the provision of a novel scraper and leveler of the above character which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1 is a top plan view of the improved scraper and leveler,

Figure 2 is a side elevation of the same,

Figure 3 is a fragmentary longitudinal section through the scraper taken on the line 3—3 of Figure 1 looking in the direction of the arrows illustrating the novel scraping blade and the novel adjusting mechanism and hitch, Figure 4 is a transverse section through the leveler and scraper taken on the line 4—4 of Figure 1 looking in the direction of the arrows illustrating the means of connecting the bars of the hitch to the frame of the scraper and leveler, Figure 5 is a section taken on the line 5—5 of Figure 3 looking in the direction of the arrows illustrating in detail the adjusting mechanism, Figure 6 is a detail section taken on the line 6—6 of Figure 3 looking in the direction of the arrows showing the pivot points of the adjusting mechanism, and Figure 7 is a detail transverse section taken on the line 7—7 of Figure 3 looking in the direction of the arrows illustrating the connection between the tongue and the reach bars.

Referring to the drawing in detail, wherein similar reference characters designate corresponding parts throughout the several views the letter A generally indicates the improved scraper and leveler which comprises a frame 10 including a pair of spaced longitudinally extending frame bars 11 and 12. These bars 11 and 12 may be constructed from suitable timber and the lower faces thereof may be provided with wear irons (not shown) if preferred. The rear ends of the frame bars 12 on the inner surfaces thereof may be provided with suitable shoes 13. The frame adjacent to its forward end and at an intermediate portion is provided with transverse brace bars or beams 14 and 15 which also serve as means for receiving the scraping and leveling blades 16 and 17. These blades are of a U-shape in plan with the legs thereof extending forwardly. If desired these blades 16 and 17 can terminate short of the upper edge of the beams so as to save material. Directly in front of the rear scraping blade 17 is arranged a transverse connecting rod 18 on which is rockably mounted the arcuate arms 19 of the forwardly extending reach bars 20 of the draft mechanism. These reach bars 20 gradually converge toward their forward ends and are preferably constructed from channel iron. Adjacent to the forward ends of the bars but spaced therefrom is a connecting cross bar 21. The tongue of the draft appliance 22 is preferably constructed from an H beam and is arranged between the forward ends of the reach bars 20 and a bracket of strap iron 23 connects the forward ends of the bars together and forms a support for the tongue 22. A pivot bolt 24 arranged in front of the bracket 23 is utilized for pivotally connecting the tongue with the reach bars. It is to be noted that the tongue 22 extends rearwardly of the bracket 23 and also rests upon the cross bar 21. An upstanding U-shaped standard 25 is carried by the frame and is connected preferably with the front beam 14 and this standard supports intermediate the legs thereof an anti-friction roller 26 which rests upon an arm 27 of the adjusting lever 28. This adjusting lever 28 is of a substantially bell crank type and is pivoted at its angle as at 29' to a bracket 29, said bracket being riveted or otherwise secured to the tongue 22. A ratchet segment 30 is connected with the tongue for the lever 28 and the lever is provided with a suitable hand manipulated pawl 31 for engaging the segment rack so as to hold the lever and consequently the blades in an adjusted position, as will be later described. The extreme forward end of the tongue is provided with a clevis 32 whereby the scraper leveler may be connected with a suitable tractor or other source of power. The connection of the scraper and leveler with a tractor or other source of power allows the tongue to be swung on the tractor or other source of power at a pivot.

In operation of the improved device, the same is connected with a tractor or other source of power and is driven over the ground level. The blades 16 and 17 act upon the ground to scrape the earth and effectively level the same. These blades carry the earth until a hollow space is reached, at which time the blade acts to spread the earth evenly over the ground surface. It can be seen that the ground is acted upon first by the front scraper and then by the rear scraper and that these scrapers act in conjunction with one another effectively to scrape the ground and spread the earth over the surface.

The frame of the combined leveler and scraper may be easily adjusted by manipulating the lever 28 and it may be seen that upon downward movement of the lever that the arm 27 thereof will be raised consequently bringing about the upward swinging movement of the frame upon its rear ends or shoes 13 thereof. By this arrangement, relation of the scraping blades to the ground can be readily adjusted.

In order to hold the arcuate arms 19 of the reach bars 20 in place against lateral movement on the bar or rod 18, a spreader 33 is placed upon said rod with its ends in engagement with said arms 19.

Changes in details may be made without departing from the spirit or scope of this invention, but

What I claim as new is:

1. A leveler and scraper comprising a pair of longitudinal beams arranged in spaced relation, a front transverse beam, a rear transverse beam arranged at points equidistant from the extremities of the longitudinal beams, said transverse beams being connected with the longitudinal beams, scraping blades connected with the longitudinal and transverse beams, and a draft appliance connected with the longitudinal beams directly in front of said rear transverse beam.

2. A leveler and scraper comprising a pair of spaced longitudinally extending beams, a front and a rear transverse beam connected with the longitudinal beams, the rear transverse beam being arranged at points equidistant from the extremities of the longitudinal beams, a draft appliance including a tongue, means connecting the tongue to the longitudinal beams directly in front of the rear transverse beam, a clevis carried by the front of the tongue, and means for adjusting the longitudinal beams relatively to said tongue.

3. A leveler and scraper comprising a pair of spaced longitudinally extending beams, a front and a rear transverse beam, the transverse beams being connected with the longitudinal beams, the rear transverse beam being arranged at points equidistant from the extremities of the longitudinal beams, shoes carried by the longitudinal beams at the rear thereof, scraping blades connected with the transverse and longitudinal beams, a tongue, reach bars rockably connected to the longitudinal beams in front of the rear transverse bar, means pivotally connecting the tongue to the reach bars, an adjusting lever on said tongues, means connecting the lever with the longitudinal beams, and a clevis carried by the front end of said tongue.

4. A leveler and scraper comprising a pair of spaced longitudinally extending beams, scraping blades of U-shape in plan arranged transversely and connected with said longitudinal beams, one of said scraping blades being arranged adjacent to the front ends of the longitudinal beams and the other at points equidistant from the extremities of said longitudinal beams, wear shoes carried by the rear ends of the longitudinal beams, a transverse rod connected with the longitudinal beams and arranged in front of the rearmost scraper blades, a pair of reach bars rockably mounted upon said rod, a tongue received between said reach bars and pivotally connected therewith, means limiting the downward swinging of the rear end of said tongue relative to said reach bars, a clevis carried by the front end of said tongue, a standard arranged intermediate the longitudinal bars connected therewith having an anti-friction roller, a bell crank lever rockably mounted at its angle upon the tongue having one arm thereof engaging said roller, and means for adjustably holding the lever in a desired position.

In testimony whereof I affix my signature.

IRA W. PENNY.